US009673688B2

(12) United States Patent
Shaw

(10) Patent No.: US 9,673,688 B2
(45) Date of Patent: Jun. 6, 2017

(54) APPARATUS AND METHOD FOR FORMING A MAGNET ASSEMBLY

(71) Applicant: E-Circuit Motors, Inc., Concord, MA (US)

(72) Inventor: Steven Robert Shaw, Bozeman, MT (US)

(73) Assignee: E-Circuit Motors, Inc., Concord, MA (US)

( * ) Notice: Subject to any disclaimer, the term of this patent is extended or adjusted under 35 U.S.C. 154(b) by 0 days.

(21) Appl. No.: 15/208,452

(22) Filed: Jul. 12, 2016

(65) Prior Publication Data

US 2017/0098985 A1     Apr. 6, 2017

Related U.S. Application Data

(60) Provisional application No. 62/275,653, filed on Jan. 6, 2016, provisional application No. 62/236,407, filed
(Continued)

(51) Int. Cl.
*H01F 7/06* (2006.01)
*H02K 15/03* (2006.01)
(Continued)

(52) U.S. Cl.
CPC .......... *H02K 15/03* (2013.01); *H01F 7/0242* (2013.01); *H01F 7/0252* (2013.01);
(Continued)

(58) Field of Classification Search
CPC ......... H02K 15/03; H01F 7/02; H01F 7/0242; H01F 7/0252; H01F 7/0263; B42F 1/06; G09F 7/04
(Continued)

(56) References Cited

U.S. PATENT DOCUMENTS 2,970,238 A    1/1961 Swiggett
3,096,455 A    7/1963 Hahn
(Continued)

FOREIGN PATENT DOCUMENTS

CN    103001426 A    3/2013
CN    104426263 A    3/2015
(Continued)

OTHER PUBLICATIONS

Office Action for U.S. Appl. No. 15/199,527 dated Sep. 29, 2016.
(Continued)

*Primary Examiner* — Paul D Kim
(74) *Attorney, Agent, or Firm* — Pierce Atwood LLP

(57) ABSTRACT

An apparatus for forming a magnet assembly may comprise a base, a bearing assembly, and a support structure positioning mechanism. The bearing assembly may be configured to support a magnet and to allow the magnet to rotate about an axis normal to a surface of the base. The support structure positioning mechanism may be configured to position a support structure on the magnet when the magnet is on the base. The base may comprise at least one magnet alignment feature that causes the magnet to rotate about the axis to a preferred angular orientation corresponding to a lower energy configuration as a function of angle about the axis as the magnet moves closer to the base. The bearing assembly may be movable along the axis to allow the magnet to be moved closer to the base and cause the magnet to achieve the preferred angular orientation.

27 Claims, 17 Drawing Sheets

Related U.S. Application Data on Oct. 2, 2015, provisional application No. 62/236,422, filed on Oct. 2, 2015.

(51) Int. Cl.
    H02K 1/27    (2006.01)
    H01F 7/02    (2006.01)
    H02K 41/02   (2006.01)

(52) U.S. Cl.
    CPC .......... *H01F 7/0263* (2013.01); *H02K 1/2793* (2013.01); *H02K 41/02* (2013.01)

(58) Field of Classification Search
    USPC ........................................ 29/602.1, 605–607
    See application file for complete search history.

(56)    References Cited

U.S. PATENT DOCUMENTS

| | | |
|---|---|---|
| 4,115,915 A | 9/1978 | Godfrey |
| 4,658,162 A | 4/1987 | Koyama et al. |
| 4,677,332 A | 6/1987 | Heyraud et al. |
| 4,733,115 A | 3/1988 | Barone et al. |
| 4,804,574 A | 2/1989 | Osawa et al. |
| 5,099,162 A | 3/1992 | Sawada |
| 5,126,613 A | 6/1992 | Choi |
| 5,332,460 A * | 7/1994 | Hosoya ................. B29B 13/022 156/242 |
| 5,644,183 A | 7/1997 | Van Loenen et al. |
| 5,710,476 A * | 1/1998 | Ampela .................. H02K 1/32 310/264 |
| 5,952,742 A | 9/1999 | Stoiber et al. |
| 6,628,038 B1 | 9/2003 | Shikayama et al. |
| 7,109,625 B1 | 9/2006 | Jore et al. |
| 7,112,910 B2 | 9/2006 | Lopatinsky et al. |
| 7,301,428 B2 | 11/2007 | Suzuki |
| 7,415,756 B2 | 8/2008 | Ishida et al. |
| 7,523,540 B2 | 4/2009 | Morel |
| 7,750,522 B2 | 7/2010 | Gizaw et al. |
| 7,812,697 B2 * | 10/2010 | Fullerton .............. H01F 7/0284 335/285 |
| 7,882,613 B2 | 2/2011 | Barthelmie et al. |
| 8,058,762 B2 * | 11/2011 | Asano .................. H02K 1/2793 310/156.33 |
| 8,225,497 B2 | 7/2012 | Johnson et al. |
| 8,339,019 B1 | 12/2012 | Oyague |
| 8,362,731 B2 | 1/2013 | Smith et al. |
| 8,397,369 B2 | 3/2013 | Smith et al. |
| 8,400,038 B2 | 3/2013 | Smith et al. |
| 8,558,425 B2 | 10/2013 | Stahlhut et al. |
| 8,598,761 B2 | 12/2013 | Langford et al. |
| 8,692,637 B2 * | 4/2014 | Richards .................. B42F 1/00 335/306 |
| 8,716,913 B2 | 5/2014 | Kvam et al. |
| 8,723,052 B1 | 5/2014 | Sullivan et al. |
| 8,723,402 B2 | 5/2014 | Oyague |
| 8,736,133 B1 | 5/2014 | Smith et al. |
| 8,785,784 B1 | 7/2014 | Duford et al. |
| 8,823,241 B2 | 9/2014 | Jore et al. |
| 8,941,961 B2 | 1/2015 | Banerjee et al. |
| 9,013,257 B2 | 4/2015 | Steingroever |
| 9,154,024 B2 | 10/2015 | Jore et al. |
| 9,269,483 B2 | 2/2016 | Smith et al. |
| 9,479,038 B2 | 10/2016 | Smith et al. |
| 2006/0055265 A1 | 3/2006 | Zalusky |
| 2006/0202584 A1 | 9/2006 | Jore et al. |
| 2008/0067874 A1 | 3/2008 | Tseng |
| 2008/0100166 A1 | 5/2008 | Stahlhut et al. |
| 2009/0021333 A1 * | 1/2009 | Fiedler .................. H01F 7/0263 335/285 |
| 2009/0072651 A1 | 3/2009 | Yan et al. |
| 2010/0000112 A1 | 1/2010 | Carow et al. |
| 2010/0123372 A1 | 5/2010 | Huang et al. |
| 2012/0033236 A1 | 2/2012 | Tsugimura |
| 2012/0041062 A1 | 2/2012 | Zhou et al. |
| 2012/0217831 A1 | 8/2012 | Jore et al. |
| 2012/0262019 A1 | 10/2012 | Smith et al. |
| 2012/0262020 A1 | 10/2012 | Smith et al. |
| 2013/0049500 A1 | 2/2013 | Shan et al. |
| 2013/0052491 A1 | 2/2013 | Bull et al. |
| 2013/0053942 A1 | 2/2013 | Kamel et al. |
| 2013/0072604 A1 | 3/2013 | Bowen, III et al. |
| 2013/0076192 A1 | 3/2013 | Tanimoto |
| 2013/0119802 A1 | 5/2013 | Smith et al. |
| 2013/0214631 A1 | 8/2013 | Smith et al. |
| 2013/0234566 A1 | 9/2013 | Huang et al. |
| 2014/0021968 A1 | 1/2014 | Lee |
| 2014/0021969 A1 | 1/2014 | Tseng et al. |
| 2014/0021972 A1 | 1/2014 | Barabi et al. |
| 2014/0028149 A1 | 1/2014 | Oyague |
| 2014/0042868 A1 | 2/2014 | Sullivan et al. |
| 2014/0152136 A1 | 6/2014 | Duford et al. |
| 2014/0175922 A1 | 6/2014 | Jore et al. |
| 2014/0201291 A1 | 7/2014 | Russell |
| 2014/0262499 A1 | 9/2014 | Smith et al. |
| 2014/0268460 A1 | 9/2014 | Banerjee et al. |
| 2014/0368079 A1 | 12/2014 | Wong et al. |
| 2015/0084446 A1 | 3/2015 | Atar |
| 2015/0188375 A1 | 7/2015 | Sullivan et al. |
| 2015/0188391 A1 | 7/2015 | Carron et al. |
| 2015/0311756 A1 | 10/2015 | Sullivan |
| 2015/0318751 A1 | 11/2015 | Smith et al. |
| 2016/0247616 A1 | 8/2016 | Smith et al. |
| 2016/0372995 A1 | 12/2016 | Smith et al. |
| 2017/0040878 A1 | 2/2017 | Smith et al. |

FOREIGN PATENT DOCUMENTS

| | | |
|---|---|---|
| EP | 0563852 A1 | 10/1993 |
| EP | 2882079 A2 | 6/2015 |
| FR | 2262880 A1 | 9/1975 |
| GB | 2485185 A | 5/2012 |
| JP | 59213287 A | 12/1984 |
| JP | 58-36145 B2 | 12/2015 |
| WO | WO 2004/073365 A2 | 8/2004 |
| WO | WO 2009/068079 A1 | 6/2009 |

OTHER PUBLICATIONS

International Search Report and Written Opinion for Application No. PCT/US2016/054794 mailed Jan. 4, 2017.
International Search Report and Written Opinion for Application No. PCT/US2016/054704 mailed Jan. 20, 2017.

* cited by examiner

APPARATUS AND METHOD FOR FORMING A MAGNET ASSEMBLY

RELATED APPLICATIONS

This application claims the benefit under 35 U.S.C. §119(e) to U.S. Provisional Application Ser. No. 62/275,653, entitled "ALIGNMENT OF MAGNETIC COMPONENTS IN AXIAL FLUX MACHINES WITH GENERALLY PLANAR WINDINGS," filed on Jan. 6, 2016, which is incorporated herein by reference in its entirety for all purposes. This application also claims the benefit under 35 U.S.C. §119(e) to each of U.S. Provisional Application Ser. No. 62/236,407, entitled "STRUCTURES TO REDUCE LOSSES IN PRINTED CIRCUIT BOARD WINDINGS," filed on Oct. 2, 2015, and U.S. Provisional Application Ser. No. 62/236,422, entitled "STRUCTURES TO REDUCE LOSSES IN PRINTED CIRCUIT BOARD WINDINGS," filed on Oct. 2, 2015, each of which is incorporated herein by reference in its entirety for all purposes.

FIELD

This disclosure relates to the handling of magnets and, more particularly, to the handling of magnets to create structures suitable for use in axial flux motors.

BACKGROUND

Axial flux motors and generators are known in the art. In such machines, a stator assembly is interposed between two magnets magnetized with alternating north-south poles. These magnets are affixed to a rotor shaft via a back iron assembly for connection to a mechanical load (or source for a generator). An example of such an axial flux motor/generator is described in U.S. Pat. No. 7,109,625 ("the '625 patent"), which is incorporated herein by reference in its entirety.

A known assembly procedure for affixing a ring magnet to a back iron assembly for use in such an axial flux motor involves several steps, which are illustrated in FIGS. 1-3. First, as shown in FIG. 1, a ring magnet 102 with the desired magnetic field pattern is lowered in a controlled fashion over a cylindrical shaft 104 to a steel transfer plate 106 (e.g., by reducing the height of push-off pins 108) where it is held firmly by magnetic force.

Then, as illustrated in FIG. 2, a back iron assembly 110 is lowered to the exposed side of the ring magnet 102, using the transfer plate 106 to hold the ring magnet 102 in place. Finally, as shown in FIG. 3, to release the back iron assembly 110 and ring magnet 102 from the transfer plate 106, ejector pins 112 are extended to separate and consequently reduce the force of attraction between the ring magnet 102 and transfer plate 106. The back iron assembly and magnet 102 together form a rotor assembly 114 that can be used, for example, in an axial flux motor or generator such as that described in the '625 patent.

A bottom view of a rotor assembly 114 resulting from the foregoing technique is shown in FIG. 4. As shown, in the rotor assembly 114, the magnet 102 is held in place within the back iron assembly 110 by a combination of magnetic force and/or adhesives. During the assembly operation, care is generally taken to control the transfer from one surface to another to avoid damaging or breaking magnets.

The motors/generators described in the '625 patent employ two rotor assemblies 114 such as that as shown in FIG. 4. The ring magnets 102 of the rotor assemblies 114 are magnetized so that they present an alternating sequence of north and south poles as a function of angle. Those assemblies are mounted on a rotor shaft on either side of a planar stator, and are oriented so that the north poles on one assembly correspond to and face the south poles on the opposing assembly. In some cases, rotor assemblies 114 have been assembled to a rotor shaft of a motor or generator using an adhesive product, such as LOCTITE.

SUMMARY

In some implementations, a method for forming a magnet assembly involves disposing a magnet on a bearing assembly so that the magnet is free to rotate about an axis normal to a surface of a base. The base comprises at least one magnet alignment feature that causes the magnet to rotate about the axis to a preferred angular orientation corresponding to a lower energy configuration as a function of angle about the axis as the magnet is moved closer to the base. The bearing assembly is moved relative to the base to bring the magnet closer to the base and allow the magnet to achieve the preferred angular orientation, and is further moved relative the base until a surface of the magnet contacts the surface of the base. A support structure is positioned on the magnet while keeping an angular positioning feature of the support structure aligned with a particular angular position of the base.

In some embodiments, an apparatus for forming a magnet assembly comprises a base, a bearing assembly, and a support structure positioning mechanism. The bearing assembly is configured to support a magnet and to allow the magnet to rotate about an axis normal to a surface of the base. The support structure positioning mechanism is configured to position a support structure on the magnet when the magnet is on the base. The base comprises at least one magnet alignment feature that causes the magnet to rotate about the axis to a preferred angular orientation corresponding to a lower energy configuration as a function of angle about the axis as the magnet moves closer to the base. The bearing assembly is movable along the axis to allow the magnet to be moved closer to the base and cause the magnet to achieve the preferred angular orientation, and to be further moved until a surface of the magnet contacts the surface of the base. The support structure positioning mechanism is configured to position the support structure on the magnet while keeping an angular positioning feature of the support structure aligned with a particular angular position of the base.

DETAILED DESCRIPTION

Figure 1:
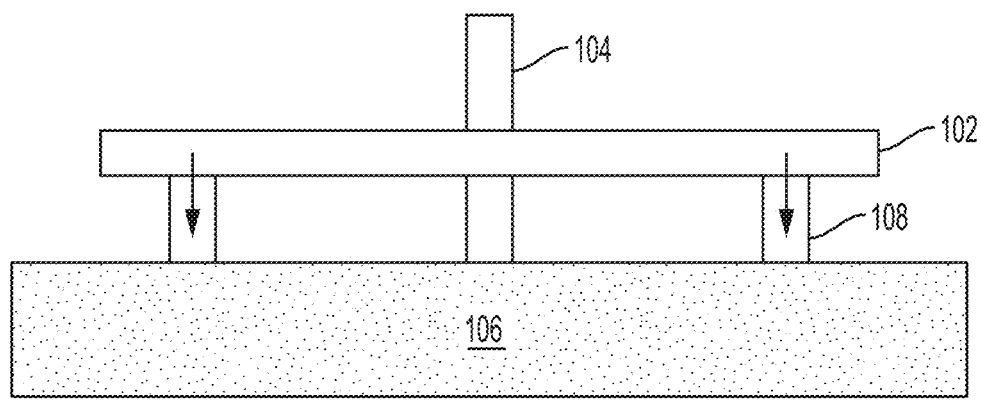
FIG. 1 illustrates a first step of a prior art technique for forming a rotor assembly for an axial flux motor.
Figure 2:
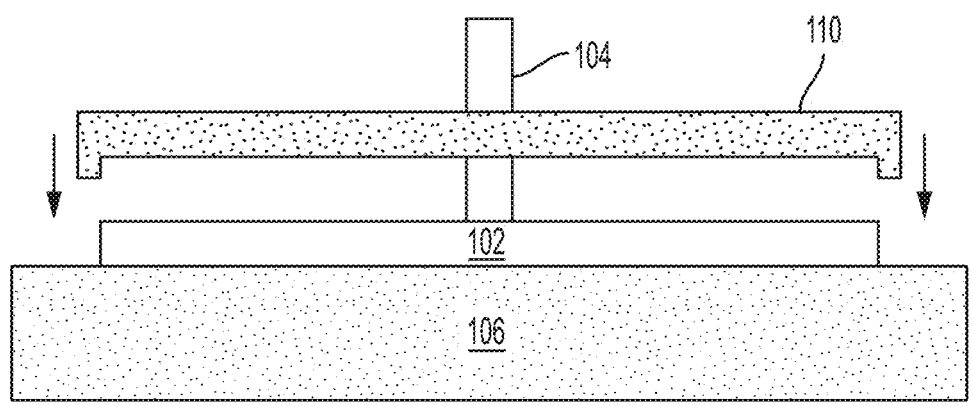
FIG. 2 illustrates a second step of a prior art technique for forming a rotor assembly for an axial flux motor.
Figure 3:
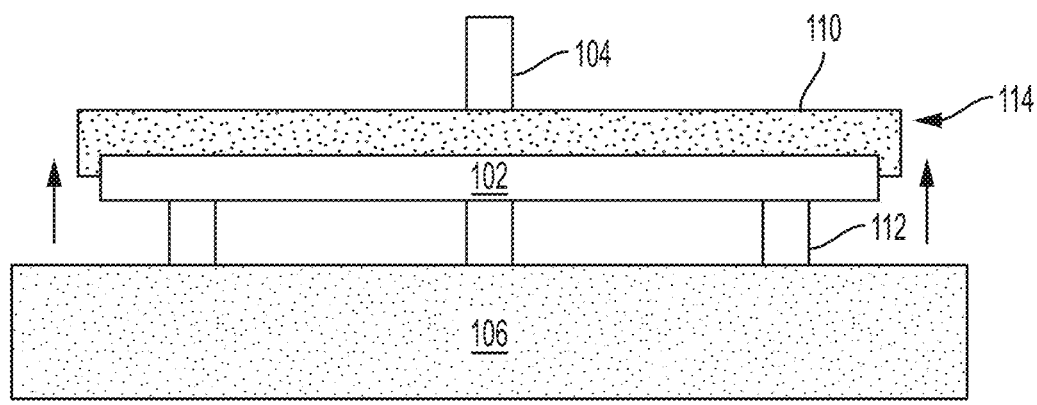
FIG. 3 illustrates a third step of a prior art technique for forming a rotor assembly for an axial flux motor.
Figure 4:
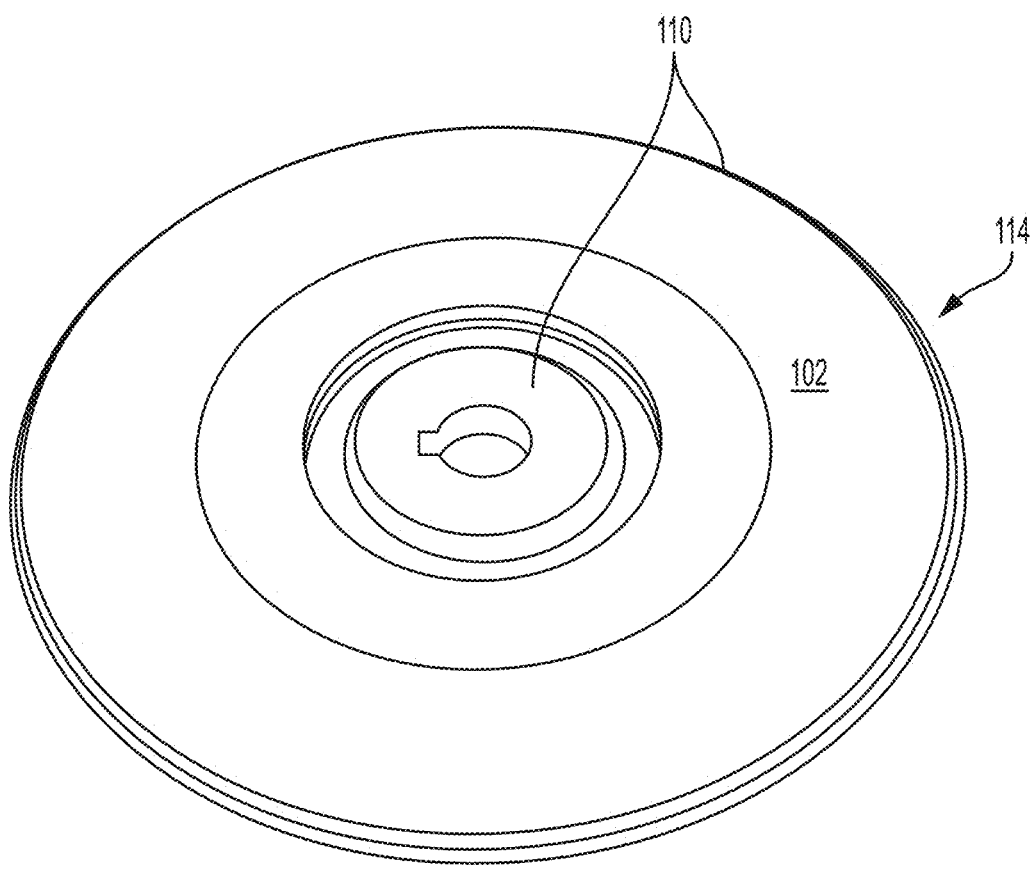
FIG. 4 is a perspective view of a rotor assembly resulting from the prior art technique shown in FIGS. 1-3.

Axial flux motors, such as that described in the '625 patent, are sometimes assembled with only one magnetic rotor assembly keyed to the rotor shaft, the other rotor assembly being allowed to "float" and self-align on the rotor shaft with respect to the fixed rotor assembly. FIG. 4 of '625 patent, for example, illustrates only a single shaft key 13A to secure only one of the two rotors 14A-B to a drive shaft 13. The inventor has recognized and appreciated that this practice can result in disadvantages in certain circumstances, e.g., under high torque conditions.

With a self-aligning design, such as that described in the '625 patent, under no-load conditions, the magnetic interaction between the rotor assemblies aligns north and south poles in the desired fashion, creating an alternating magnetic field pattern in the gap between the ring magnets. The force of attraction between rotor assemblies can be considerable. In such designs, however, there is no mechanism for an unsecured rotor assembly to transmit torque to the rotor shaft other than through friction and by participating in the magnetic field of the secured rotor assembly (remaining aligned with the field of the fixed rotor assembly is a low energy configuration). Thus, a torque applied to the rotor shaft—either by motor action or by the load—can cause a deviation in alignment between the rotor assemblies, in turn reducing the field in the gap. The reduced field lowers the force acting to align the unsecured rotor assembly, and also reduces the torque of electromagnetic origin for a motor and the voltage output for a generator. Collectively, these effects may compromise motor/generator performance and can potentially result in highly nonlinear behavior such as cogging. Motion between the unsecured rotor assembly and the rotor shaft may also result in fretting or similar mechanical degradation.

The apparatuses and techniques described herein allow the attachment of a magnet to a support structure (which may include a back iron) so that a feature of the support structure that is adapted to engage and transmit torque to a rotor shaft (e.g., a shaft key or other mechanism) has a particular angular orientation with respect to the poles of the magnet. When two or more rotor assemblies are formed using this technique, the resulting assemblies may not only be attached to a rotor shaft such that the poles of each of the magnets are in the correct orientation with respect to the poles of the other magnet(s) to maintain a high field in the gap(s), but also so that each rotor assembly is connected to and transmits torque to the rotor shaft.

Use of the alignment techniques disclosed herein may, in some embodiments, also permit a thickness profile of a support structure for a magnet to be optimized to the magnetic field profile of magnet. Optimizing the thickness profile may, for example, lower the finished weight of the motor or generator, reduce the moment of inertia and motor time constant, and/or allow the support structure to be stiffer at a given weight affording better control of the gap.

Figure 5:
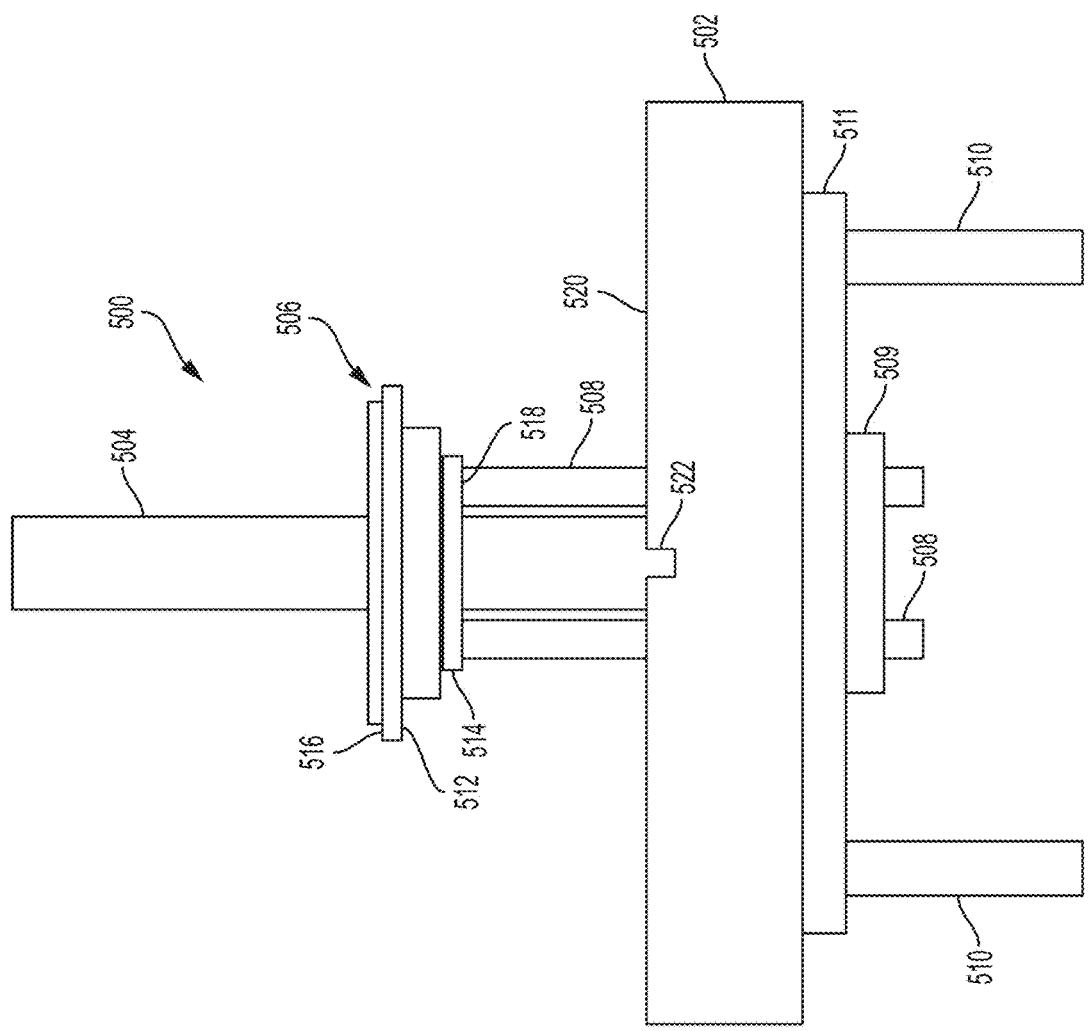
FIG. 5 is a side view of an illustrative embodiment of a magnet handling apparatus that incorporates various novel features disclosed herein.
Figure 6:
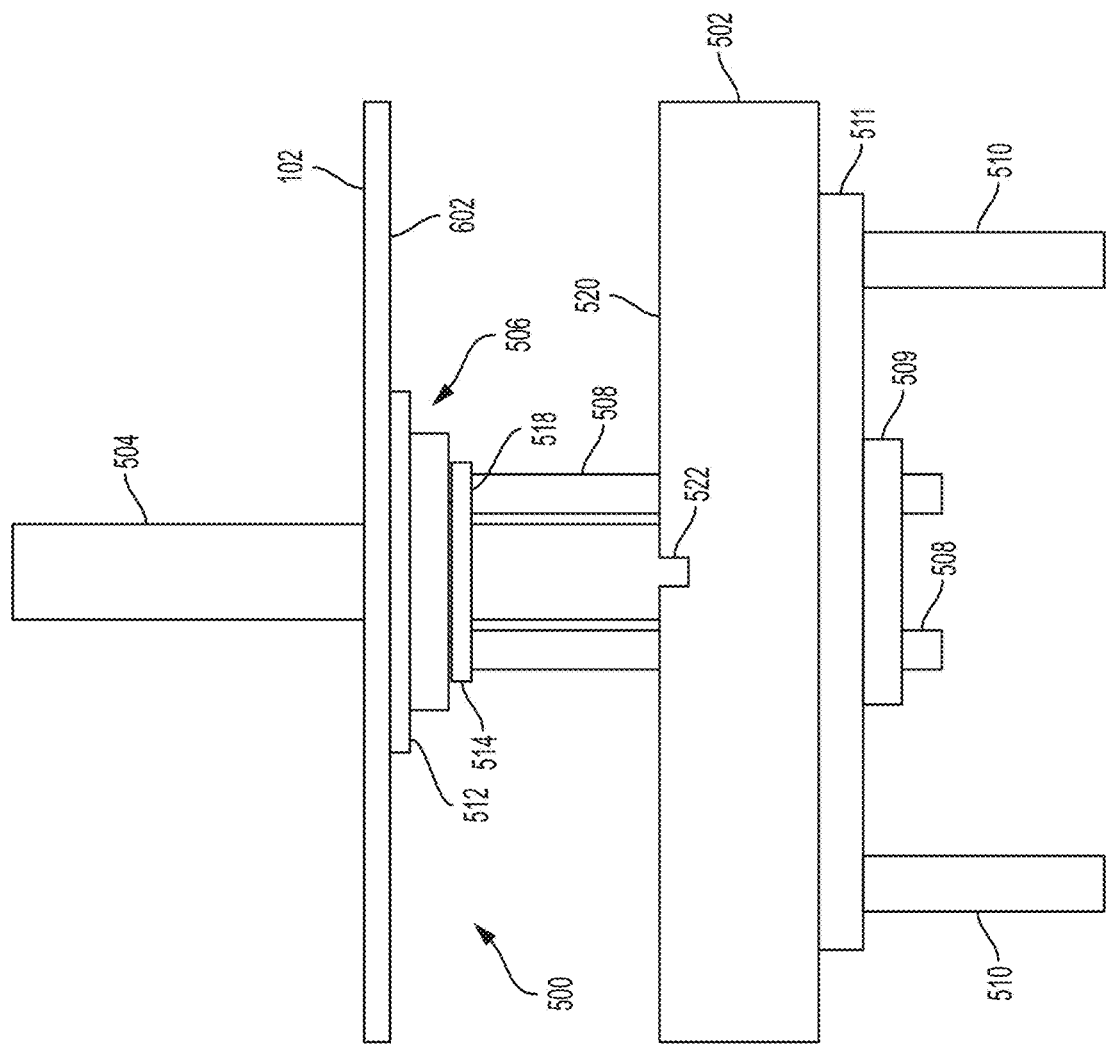
FIG. 6 is a side view of the illustrative embodiment shown in FIG. 5, with a ring magnet disposed on the bearing assembly.

FIGS. 5 and 6 are side views of an illustrative embodiment of a magnet handling apparatus 500 that incorporates various novel features disclosed herein. The only difference between FIGS. 5 and 6 is the presence of a ring magnet 102 in FIG. 6 and the absence of such a magnet in FIG. 5. The ring magnet 102 may take on any of numerous forms. In some embodiments, for example, the ring magnet 102 may comprise a neodymium magnet made from an alloy of neodymium, iron and boron to form an Nd2Fe14B tetragonal crystalline structure. As shown, the magnet handling apparatus includes a base 502, an aligning shaft 504, a bearing assembly 506, alignment members 508, an alignment member driver 509, ejector members 510, and an ejector member driver 511. Further details concerning the structure and operation of the magnet handling apparatus 500 are provided below.

Figure 7:
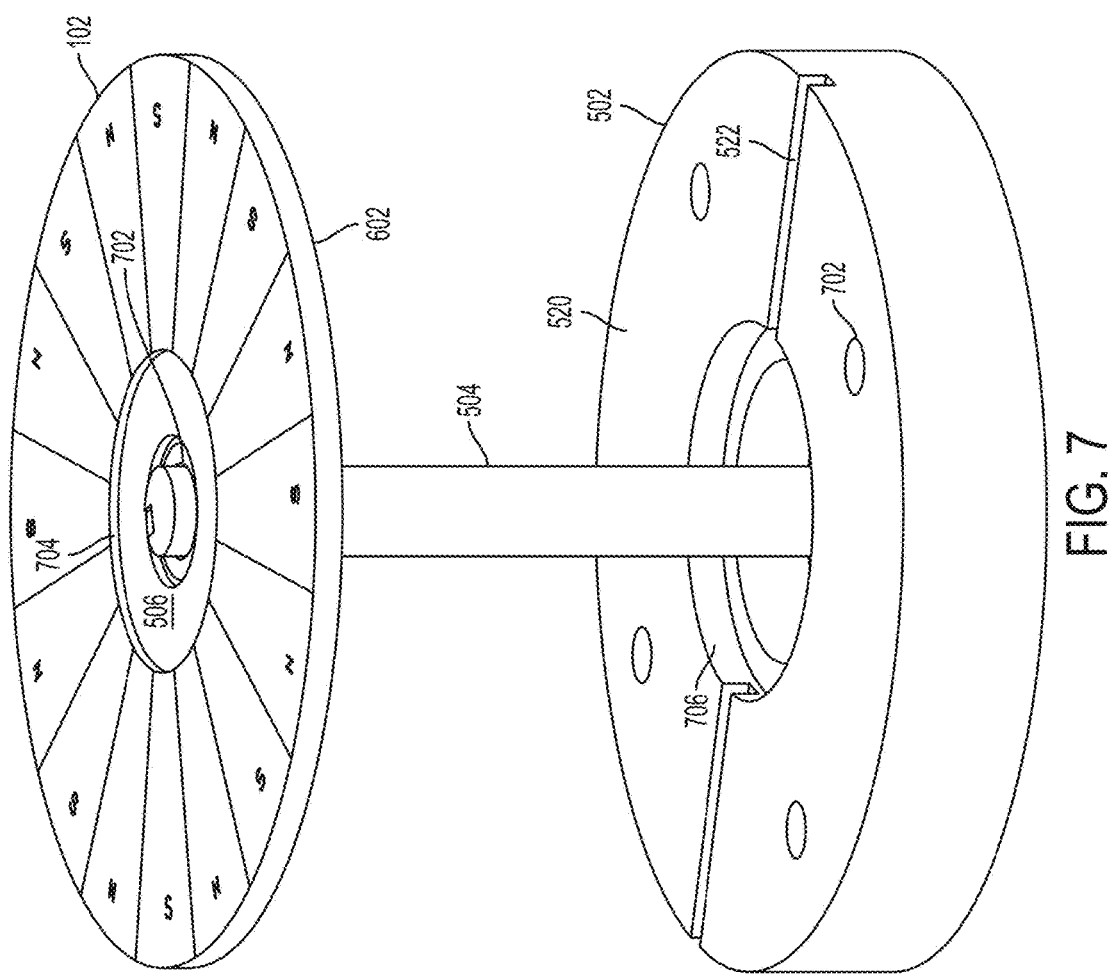
FIG. 7 is a perspective view showing a subset of the components of the magnet handling apparatus shown in FIGS. 5 and 6.
Figure 8:
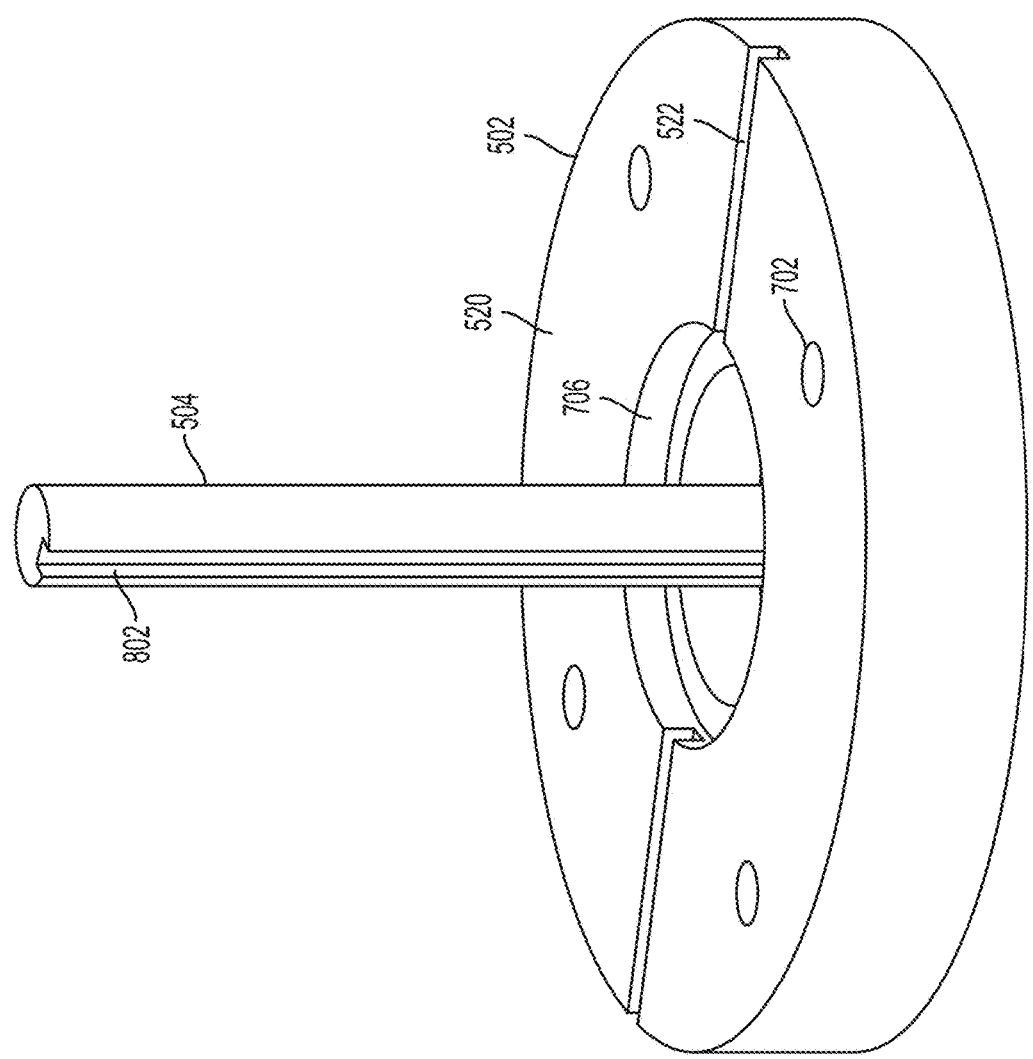
FIG. 8 is another perspective view showing another subset of the components of the magnet handling apparatus shown in FIGS. 5 and 6.

FIGS. 7 and 8 are perspective views showing different subsets of the components of the magnet handling apparatus 500 shown in FIGS. 5 and 6. In FIG. 7, the alignment members 508 and ejector members 510 are omitted. FIG. 8 shows only the base 502 and the aligning shaft 504.

Figure 9C:
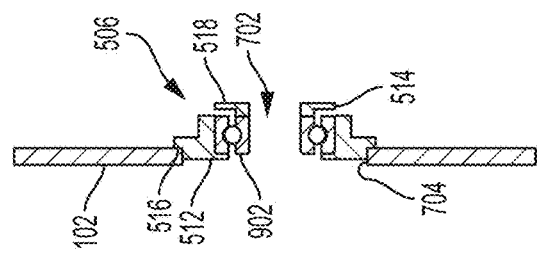
FIG. 9C is a cross-section of the components shown in FIG. 9A, taken along the line A-A.
Figure 9A:
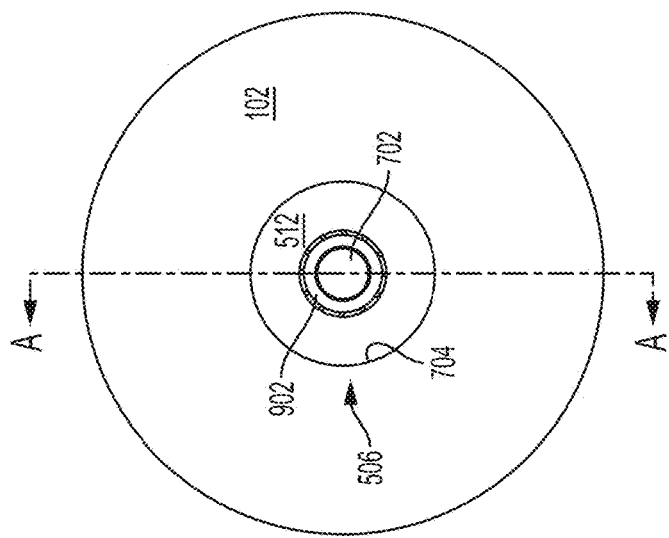
FIG. 9A is a top view of the bearing assembly shown in FIGS. 5 and 6, with the ring magnet mounted on it.
Figure 9B:
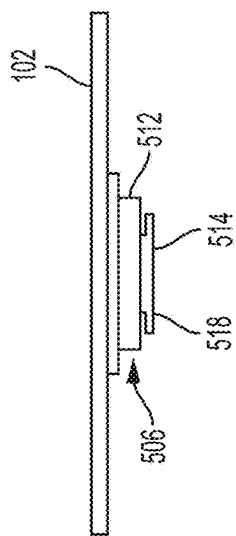
FIG. 9B is a side view of the components shown in FIG. 9A.

FIGS. 9A-C illustrate details of the bearing assembly 506 shown in FIGS. 5 and 6. Specifically, FIG. 9A is a top view of the bearing assembly 506 with the ring magnet 102 mounted on it. FIG. 9B is a side view of the components shown in FIG. 9A. FIG. 9C is a cross-section of the components shown in FIG. 9A, taken along the line A-A.

The bearing assembly 506 can take on any of numerous forms, and the invention is not limited to any particular configuration or design for this component. In the example shown, the bearing assembly 506 includes a thrust bearing 902 disposed between a bearing mount 512 and a bearing spacer 514. As shown in FIGS. 7, 9A and 9C, the bearing assembly 506 may have a cylindrical opening 702 that is sized to accommodate the cylindrical drive shaft 504. As shown in FIGS. 5 and 9C, the bearing mount 512 may also include an annular shoulder 516 sized to accommodate an inner periphery 704 (see FIGS. 7, 9A and 9C) of the ring magnet 102.

As shown in FIGS. 5, 6, 9B and 9C, the bearing spacer 514 may include an annular surface 518 shaped and sized to engage upper ends of the alignment members 508. In some implementations, the bearing assembly 506 may be permanently affixed to the upper ends of the alignment members 508. In other implementations, the bearing assembly 506 may be removable from the apparatus 500 to allow the bearing assembly 506 to be disposed in a ring magnet 102 before the bearing assembly 506 is inserted over the aligning shaft 504. Again the precise configuration and design of the bearing assembly 506 is not critical. The bearing assembly 506 need only be configured and arranged to somehow allow the ring magnet 102 to rotate relative to the base 504. In the illustrated embodiment, the bearing assembly 506 allows the ring magnet 102 to rotate about an axis normal to an upper surface 520 of the base 502.

Figure 11:
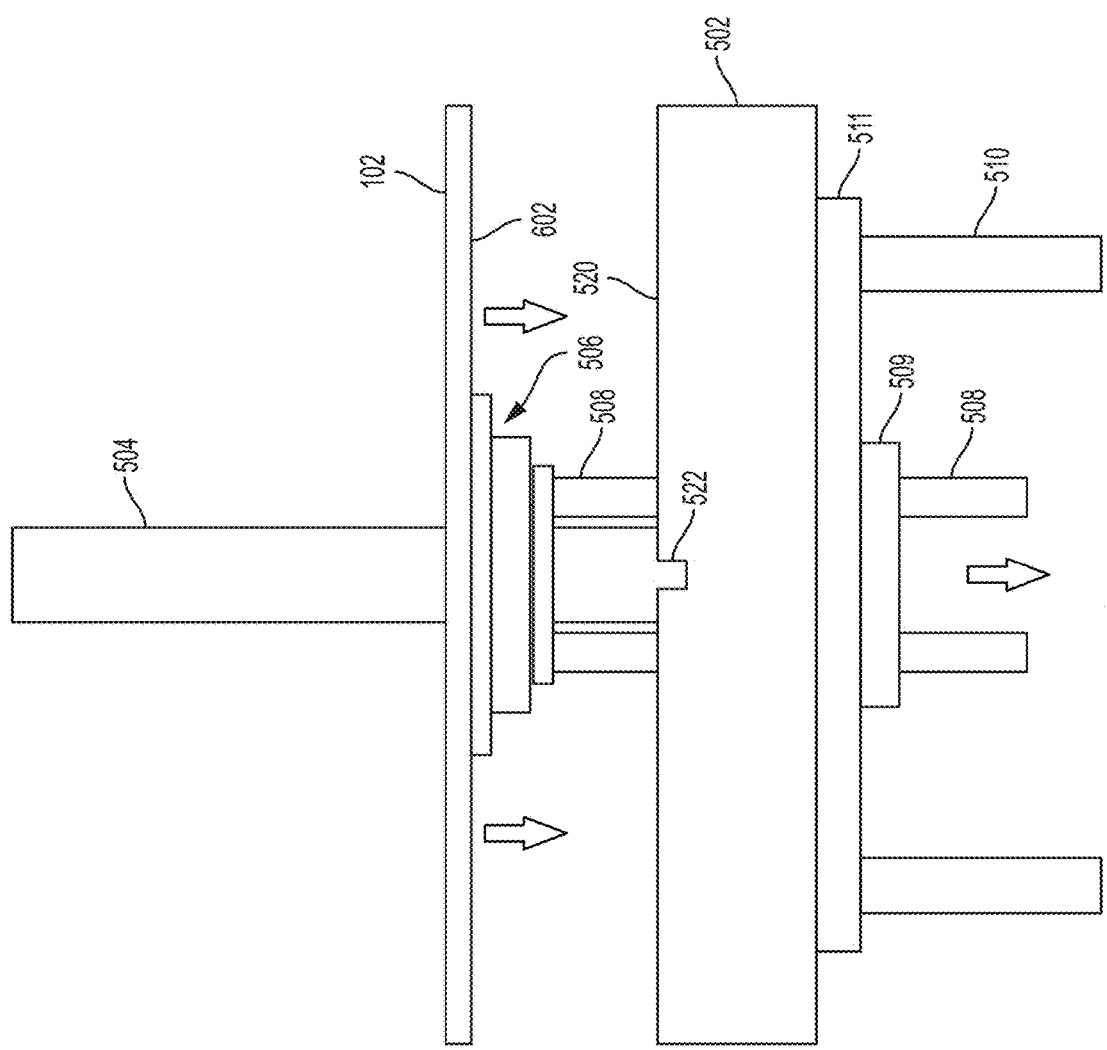
FIG. 11 is a diagram illustrating how the magnet handling apparatus shown in FIGS. 5 and 6 may be used to lower a ring magnet onto a base.

The alignment members 508 and alignment member driver 509 can also take on any of numerous configurations, and the invention is not limited to any particular design or configuration for such components. In the illustrated example, the alignment members 508 are shown as rods or pins that can be selectively moved up and down via the alignment member driver 509. Any of numerous structures may be additionally or alternatively employed as the alignment members 508. The alignment members, or perhaps only a single alignment member (e.g., a cylindrically shaped alignment member that surrounds the aligning shaft 504), need only be configured and arranged to somehow move the bearing assembly 506 relative to the base 502, as described in more detail below in connection with FIG. 11.

The alignment member driver 509 may be a purely mechanical device driven by manual force (e.g., manipulating a handle, crank, wheel, etc.), or may be an automated device using one or more pneumatic, hydraulic and/or electrical actuators configured to move one or more alignment members 508 up and down. The alignment members 508 and/or the alignment member driver 509 may either remain attached to the magnet handling apparatus 500 at all times, or may be attached to or otherwise associated with the base 502 only when needed to lower the ring magnet 102 onto the base 502.

Figure 17:
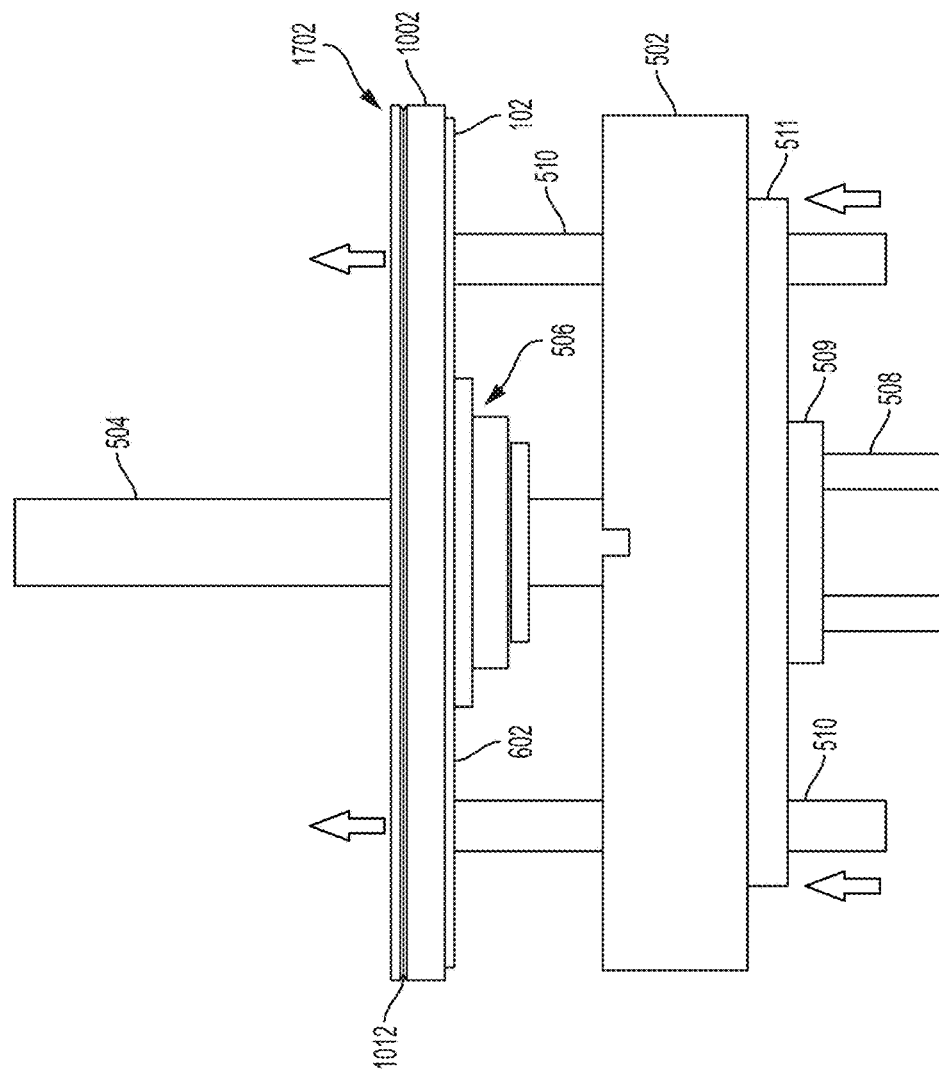
FIG. 17 is a diagram illustrating how the magnet handling apparatus shown in FIGS. 5 and 6 may be used to eject a ring magnet and support structure from base as a unit.

The ejector members 510 and ejector member driver 511 can likewise take on any of numerous configurations, and the invention is also not limited to any particular design or configuration for those components. In the illustrated example, the ejector members 510 are shown as rods or pins that can be selectively moved up and down via the ejector member driver 511. The ejector members 510 may, for example, be inserted or threaded into holes 702 in the base 502 (e.g., as illustrated in FIGS. 7 and 8). Any of numerous structures may be additionally or alternatively employed as the ejector members 510. The ejector members 501, or perhaps only a single ejector member (e.g., a cylindrically shaped alignment member that surrounds the aligning shaft 504, the alignment members 508 and the alignment driver 509), need only be configured and arranged to somehow move the ring magnet 102 and associated support structure 1002 (described below) relative to the base 502, as described in more detail below in connection with FIG. 17.

Like the alignment driver 509, the ejector member driver 511 may be a purely mechanical device driven by manual force (e.g., manipulating a handle, crank, wheel, etc.), or may be an automated device using one or more pneumatic, hydraulic and/or electrical actuators configured to move one or more ejector members 510 up and down. The ejector members 510 and/or the ejector member driver 511 may either remain attached to the magnet handling apparatus 500 at all times, or may be attached to or otherwise associated with the base 502 only when needed to eject the ring magnet 102 and associated support structure 1002 from the base, as described below in connection with FIG. 17.

In addition to the components described above, the magnet handling apparatus 500 may include a support structure positioning mechanism 1000 (shown in FIG. 10) configured and arranged to move a support structure 1002 (which may include a back iron) over a ring magnet 102 that has been brought into contact with the upper surface 520 of the base 502 after having been properly aligned with respect to the base 502 and aligning shaft 504, in the manner described below. Examples of support structures 1002 that can be used for this purpose are described below.

Figure 10:
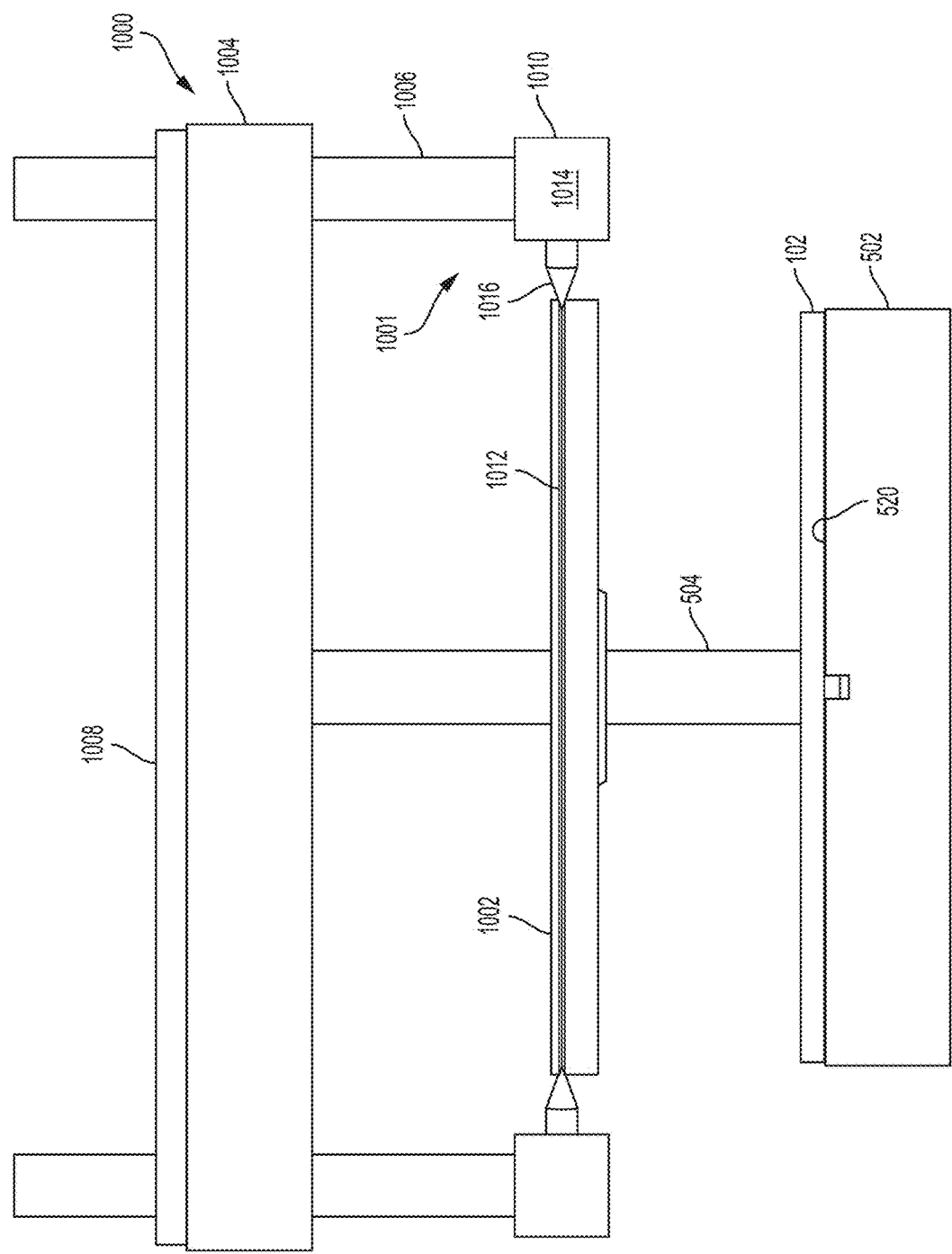
FIG. 10 illustrates an example of a support structure positioning mechanism that may be employed with the magnet handling apparatus shown in FIGS. 5 and 6.

As shown in FIG. 10, the support structure positioning mechanism 1000 may be configured in any of numerous ways, and the invention is also not limited to any particular design or configuration for this component. In the illustrated example, the support structure positioning mechanism 1000 includes a frame 1004, positioning members 1001 (each including a positioning pin or rod 1006 and a support structure holder 1010), and a positioning member driver 1008. As shown, the support structure holders 1010 may be disposed on lower ends of the positioning pins or rods 1006 and the positioning rods or pins 1006 may be selectively moved up and down relative to the frame 1004 via the positioning member driver 1008. The support structure holders 1010 may each include a body 1014 and one or more fingers 1016 that are movable relative the body 1014. As shown, the support structure 1002 may, for example, be formed with an annular groove 1012 that can be selectively engaged by the movable fingers 1016 of the support structure holders 1010 to allow the support structure to be readily grasped when the fingers 1016 are moved relative to the bodies 1014.

Figure 13:
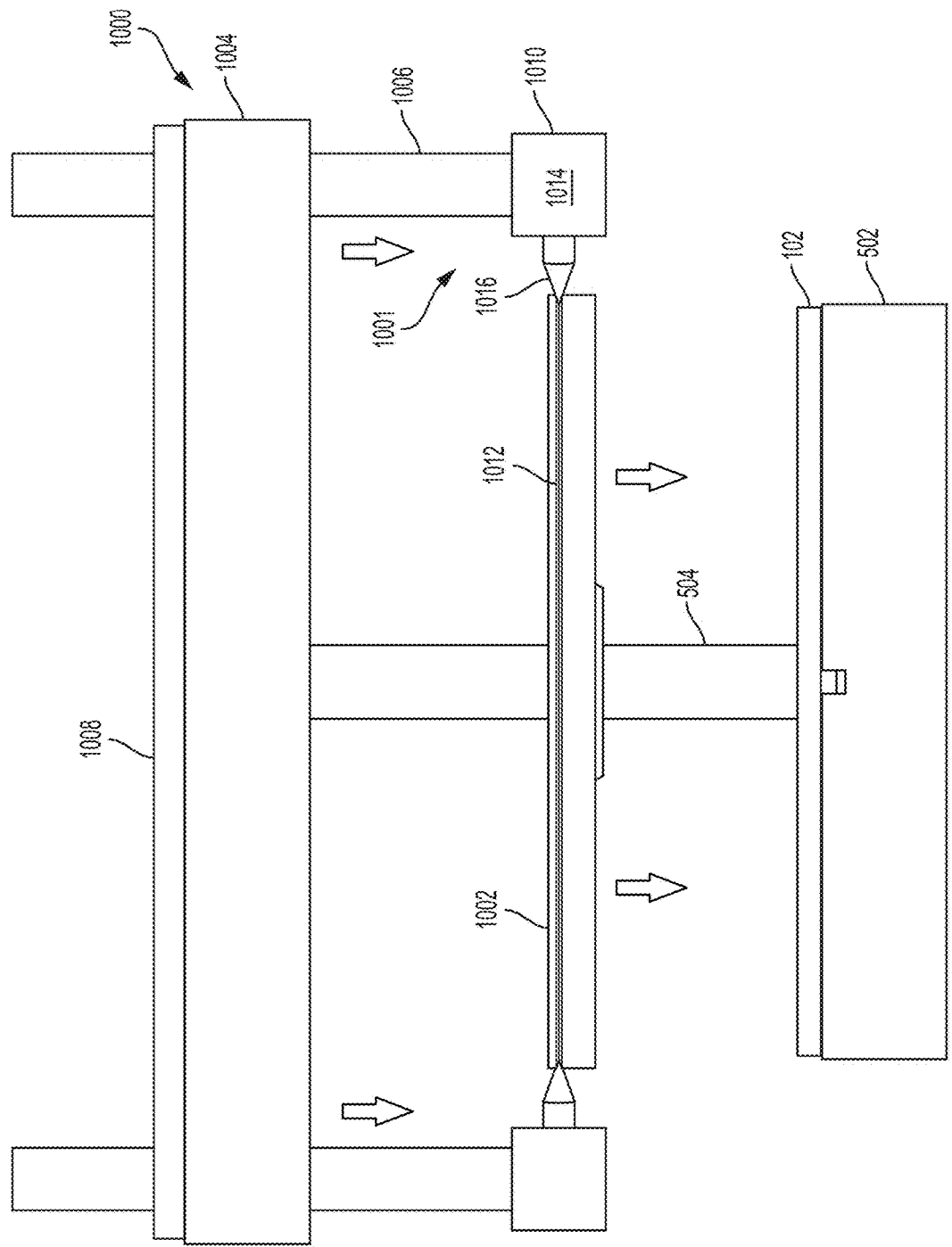
FIG. 13 is a diagram illustrating how the support structure positioning mechanism shown in FIG. 10 may be used to lower a support structure onto a ring magnet 102.

Again, it should be appreciated that the support structure positioning mechanism 1000 may take on any of a number of alternative forms and need only be configured and arranged to somehow move the support structure 1002 relative to the base 502, as described in more detail below in connection with FIG. 13.

Like the other drivers discussed above, the positioning member driver 1008 may be a purely mechanical device driven by manual force (e.g., manipulating a handle, crank, wheel, etc.), or may be an automated device using one or more pneumatic, hydraulic and/or electrical actuators configured to move one or more positioning members 1001 up and down. The positioning members 1001 and/or the positioning member driver 1008 may either remain attached to the magnet handling apparatus at all times, or may be attached to or otherwise associated with the base 502 only when needed to lower a support structure 1002 onto a ring magnet 102 on the base 502, as discussed below in connection with FIG. 13.

Although not illustrated in the figures, the magnet handling apparatus 500 may additionally employ control circuitry (e.g., a programmed microprocessor and motor power source) and a user interface, with the control circuitry selectively providing power to one or more motors in the alignment member driver 509, the positioning member driver 1008, and/or the ejector member driver 511 in response to user input via the user interface, thus enabling user control of the ring magnet alignment, support member positioning, and/or rotor assembly ejection operations described below.

An illustrative example of a method for handling a magnet and/or support structure using the magnet handling apparatus 500 will now be described with reference to the flow chart of FIG. 18, and well as with reference to various other figures. It should be appreciated that all of the steps illustrated in FIG. 18 need not be employed in all circumstances and that other steps that are not illustrated may additionally or alternatively be performed in some embodiments.

At step 1802, a ring magnet 102 is disposed on the bearing assembly 506. An example of a structure that may result after taking this step is illustrated in FIG. 6. The ring magnet 102 may be placed on the bearing assembly 506 either before or after the bearing assembly 506 is placed over the aligning shaft 504. In either case, once the ring magnet 102 is disposed on the bearing assembly 506 and the bearing assembly is disposed over the aligning shaft 504 and atop the alignment members 508, the ring magnet 102 will be disposed on the bearing assembly 506 so that the ring magnet 102 is free to rotate about an axis normal to the upper surface 520 of the base 502.

At step 1804, the bearing assembly 506 is moved closer to the base 502 so as to cause the ring magnet 102 to achieve a preferred angular orientation with respect to the base 502. As illustrated by the arrows in FIG. 11, this may be accomplished, for example, by operating the alignment member driver 509 so that the alignment members 508 move downward, thus causing the ring magnet 102 to move closer to the upper surface 520 of the base 502. Due to the presence of the bearing assembly 506, the ring magnet 102 is free to rotate in a plane normal to the surface 520 as it is lowered toward the base 502.

The base 502 may incorporate at least one magnet alignment feature that causes the ring magnet 102 to achieve a preferred angular orientation with respect to the base 502 as it is lowered. This result may be accomplished in any of numerous ways. In some implementations, for example, the base 502 may be configured such that the preferred angular orientation corresponds to a lower energy configuration as a function of angle as the ring magnet 502 is moved closer to the base 502. In the illustrated example, this functionality is achieved by the presence of a slot 522 or other discontinuity that has been milled or otherwise formed in the upper surface 520 of the base 502. The slot 522 creates a preferred, low reluctance path to which the poles of the ring magnet 102 align as the bearing assembly 506 approaches the base 502. As the ring magnet 102 approaches the base 502, some of the magnetic flux between poles of the ring magnet 102 will pass through the base 502 (which may be made of a soft magnetic material, e.g., 12L14 steel) and in doing so, due to the variation in the reluctance as function of angle created by the slot 522, will cause the ring magnet 102 to rotate on the bearing assembly 506 until it achieves a low energy, minimum reluctance configuration.

As use of such a reluctance minimum will not discriminate between north-to-south and south-to-north transitions between poles with respect to the variable reluctance feature (e.g., the slot 502), steps should be taken to confirm different north-to-south/south-to-north transitions are employed for pairs of rotor assemblies that are to be used in the same motor or generator. Although a slot is illustrated, it should be appreciated that any of numerous discontinuities other than a slot may additionally or alternatively be used to create a variable reluctance in the base 502 that varies as a function of angle about the longitudinal axis of the aligning shaft 504.

Figure 12:
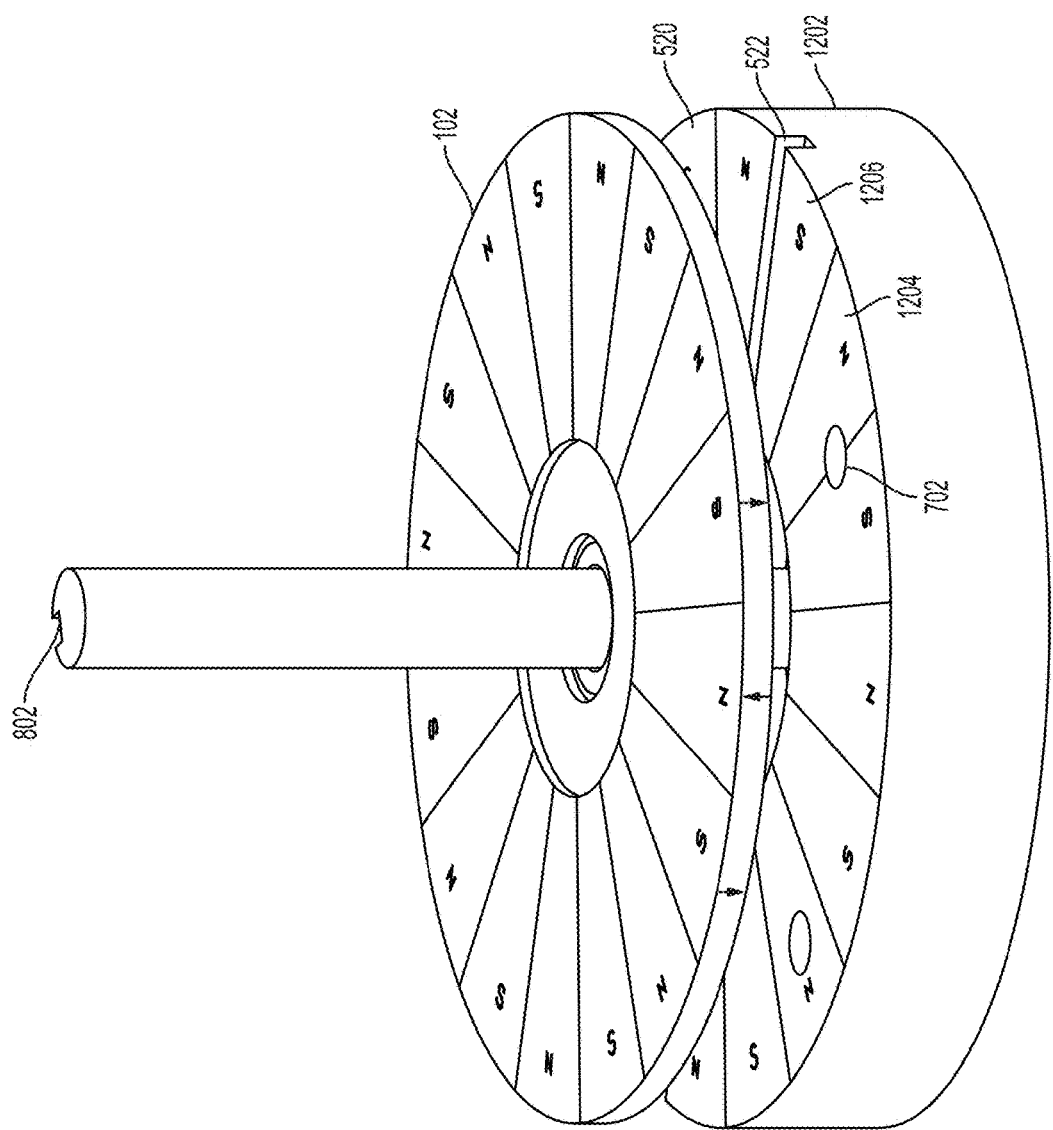
FIG. 12 is a perspective view of an example a magnet handling apparatus in which the base includes a magnetic field generating component.

Another feature that may be included in the base 502 in addition to or in lieu of a variable reluctance feature is one or more magnetic field generating components that create a variable magnetic field above the base 502 that varies as a function of angle about the longitudinal axis of the aligning shaft 504 and that can interact with the poles of the ring magnet 102 as it is lowered and thus cause the ring magnet 102 to rotate to achieve a low energy configuration based on the orientation of the generated magnetic field above the base. One example of such an implementation is shown in FIG. 12. In that example, in addition to a slot 522 that creates a variable reluctance within a base 1202, the base 1202 includes a feature to create 16 magnetic poles (e.g., north pole 1204 and south pole 1206) that correspond to the 16 poles of the ring magnet 102. A feature in the base 1202 that creates fewer poles than the ring magnet 102 could likewise be employed. As the ring magnet 102 is lowered toward the base 1202, the ring magnet 102 will rotate on the bearing assembly 506 until the north and south poles of the ring magnet align with the south and north poles of the base 1202, respectively, or otherwise achieve a low energy configuration (e.g., if the base 1202 has fewer magnetic poles than the ring magnet 102). Use of this implementation not only ensures that the ring magnet 102 will achieve a low energy orientation with respect to the variable reluctance feature (e.g., the slot 522) but also that a particular north-south or south-north transition occurs between poles with respect to the variable reluctance feature. A variable magnetic field may be generated above the base 1202 using either a permanent magnet or an electro-magnet (e.g., a coil through which a current can flow to generate the magnetic field) disposed in or near the base.

If one or more permanent magnets are employed in or near the base 1202, their orientation should be reversed when creating respective rotor assemblies for the same motor or generator using the same magnet handling apparatus 500. Alternatively, two otherwise identical magnet handling apparatuses 500 can be used, but with each having the permanent magnets in the base 1202 in the opposite orientation as the other. If one or more electro-magnets are employed, their polarities can be reversed simply by reversing the direction of current flow through the magnetic field-generating coil, thus readily allowing a pair of complementary rotor assemblies, which can be used in the same motor or generator, to be created with the same magnet handling apparatus 500. One or more magnetic field generating devices can be used either alone or together with a variable reluctance feature (e.g., a slot) to cause the ring magnet 102 to obtain a preferred angular orientation with respect to the base 1202 as the bearing assembly 506 is lowered.

In any event, provided the base 502, 1202 includes some feature that causes the ring magnet 102 to achieve a preferred angular orientation with respect to the base 502 as it is lowered, when a lower surface 602 of the ring magnet 102 contacts the upper surface 520 of the base 502, 1202 (see step 1806 in the flowchart of FIG. 18), the ring magnet 102 will not only be held in place by magnetic attraction to the base 502, 1202, but the poles of the magnet will also have a particular orientation with respect to the base 502, 1202. As shown in FIGS. 7 and 8, the base 502 may include a cavity 706 into which the bearing assembly may recede so that an upper surface of the annular shoulder 516 can become even with or lower than the upper surface 520 of the base 502, thus allowing the lower surface 602 of the ring magnet 102 to contact the upper surface 520 of the base 502.

Figure 18:
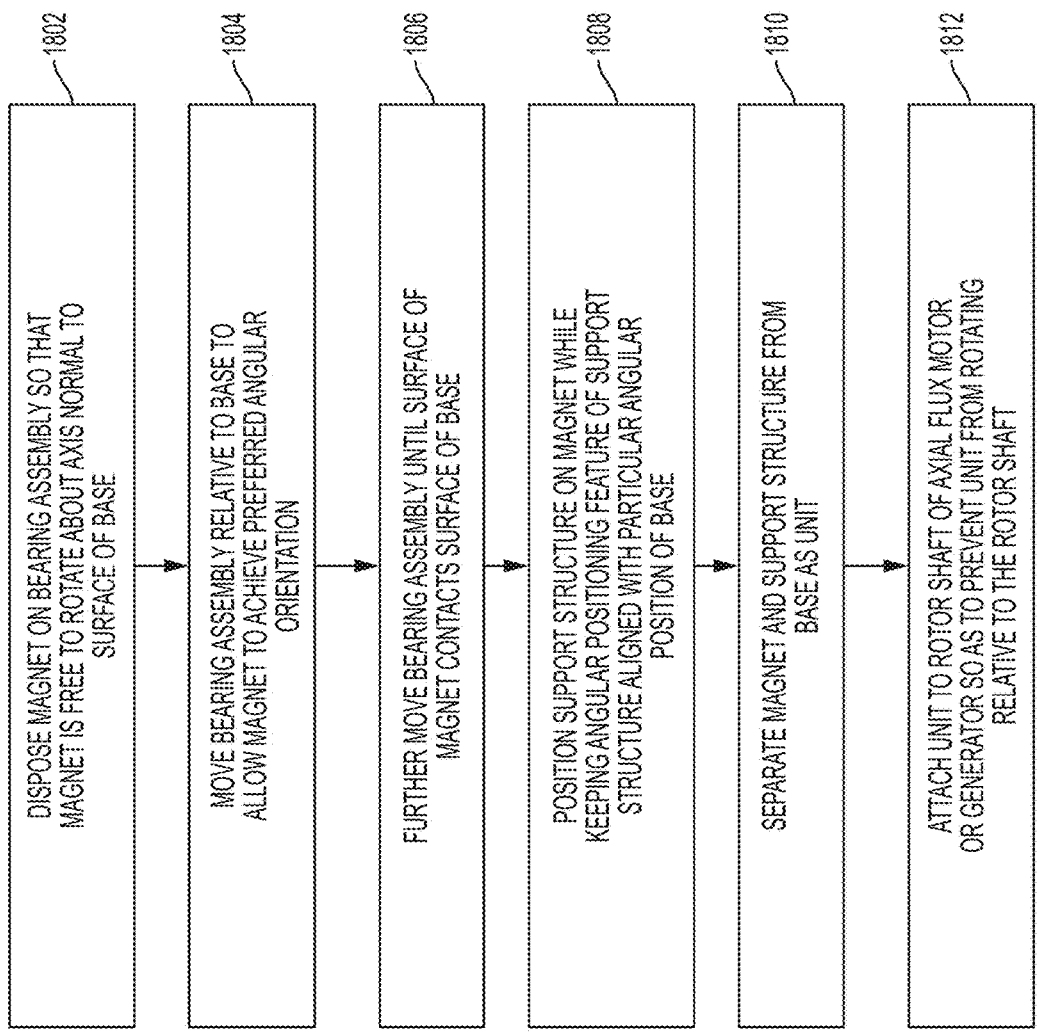
FIG. 18 is a flow chart illustrating steps of an example method that may be employed in accordance with the present disclosure.

Returning to the flowchart of FIG. 18, at the step 1808, a support structure 1002 is positioned on the ring magnet 102 while keeping an angular positioning feature of the support structure 1002 aligned with a particular angular position of the base 502, 1202. This step may be achieved in any of a number of ways, and the invention is not limited to any particular implementation. FIG. 10 (discussed above) illustrates one example of a support structure positioning mechanism 1000 that may be used for this purpose. Operation of the support structure positioning mechanism 1000 is shown in FIG. 13. As shown by the arrows in FIG. 13, the positioning member driver 1008 may lower the positioning members 1006 with respect to the frame 1004 so as to cause the support structure 1002 (held in place by the fingers 1016 of the holding members 1010) to be lowered onto the ring magnet 102.

Figure 14A:
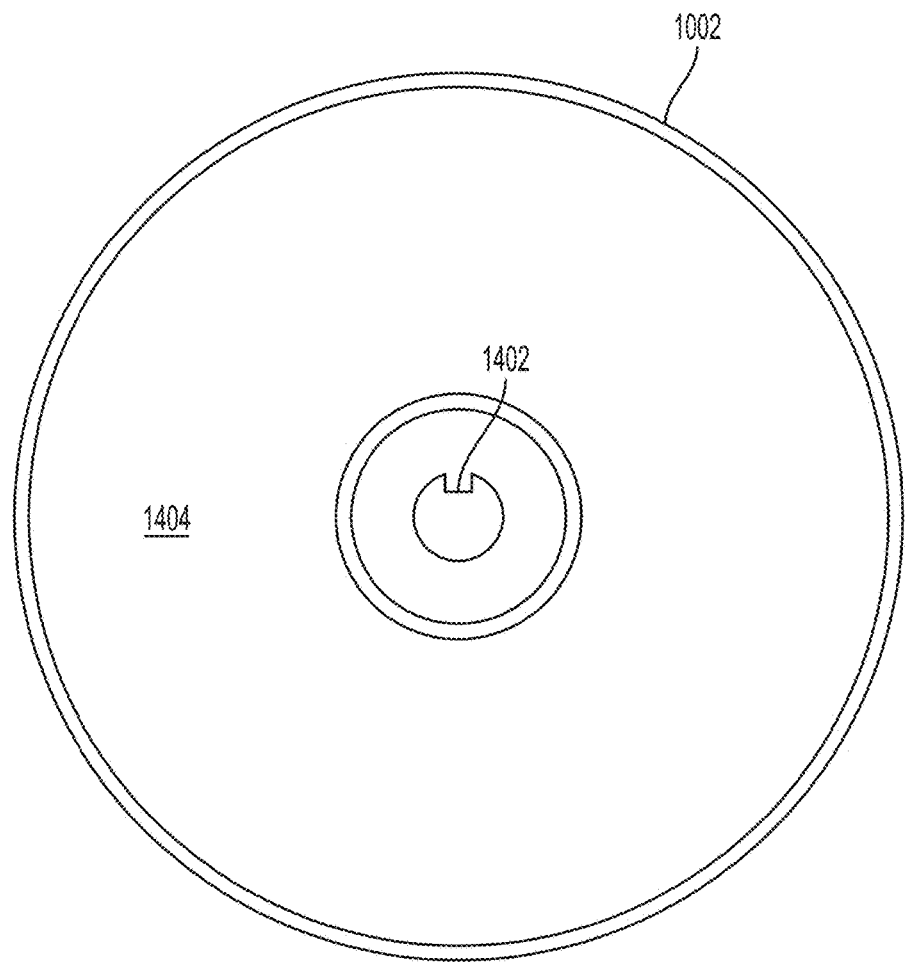
FIG. 14A is a bottom view of an example of a support structure that may be employed in certain example embodiments.
Figure 14B:
FIG. 14B is a side view of the example support structure shown in FIG. 14A.

An example configuration of the support structure 1002 is shown in FIGS. 14A-B. FIG. 14A is a bottom view of the support structure 1002 illustrating an annular cavity 1404 shaped to accommodate the corresponding annular shape of the ring magnet 102. FIG. 14B is a side view of the support structure 1002. The support structure 1002 may, for example, be made of steel and may incorporate a back iron close the magnetic circuit on the side of the ring magnet 102 facing away from the gap. As discussed above, in some embodiments the support structure 1002 may include one or more features (e.g., the annular groove 1012) to enable a support structure positioning mechanism 1000 to readily grasp and move the support structure 1002.

In some embodiments, the aligning shaft 504 may be non-rotatably connected to the base 502 and may include an angular orientation feature that can be used as a guide for attaching a support structure 1002 to the ring magnet 102 at a particular angular orientation with respect to the magnet's poles. That is, because the angular orientation feature on the aligning shaft 504 is at a fixed location with respect to the base 502, aligning the poles of the ring magnet 102 in a particular orientation with respect to the base 502 also serves to align the poles of the ring magnet 102 with the angular orientation feature of the aligning shaft 504. By keeping an corresponding angular orientation feature on the support structure 1002 aligned with the angular orientation feature on the aligning shaft 504 as the support structure is lowered onto to the ring magnet 102, the angular orientation feature on the support structure 1002 can likewise achieve a particular orientation with respect to the magnet's poles when the ring magnet 102 and support structure 1002 contact one another and become magnetically attached.

Figure 15:
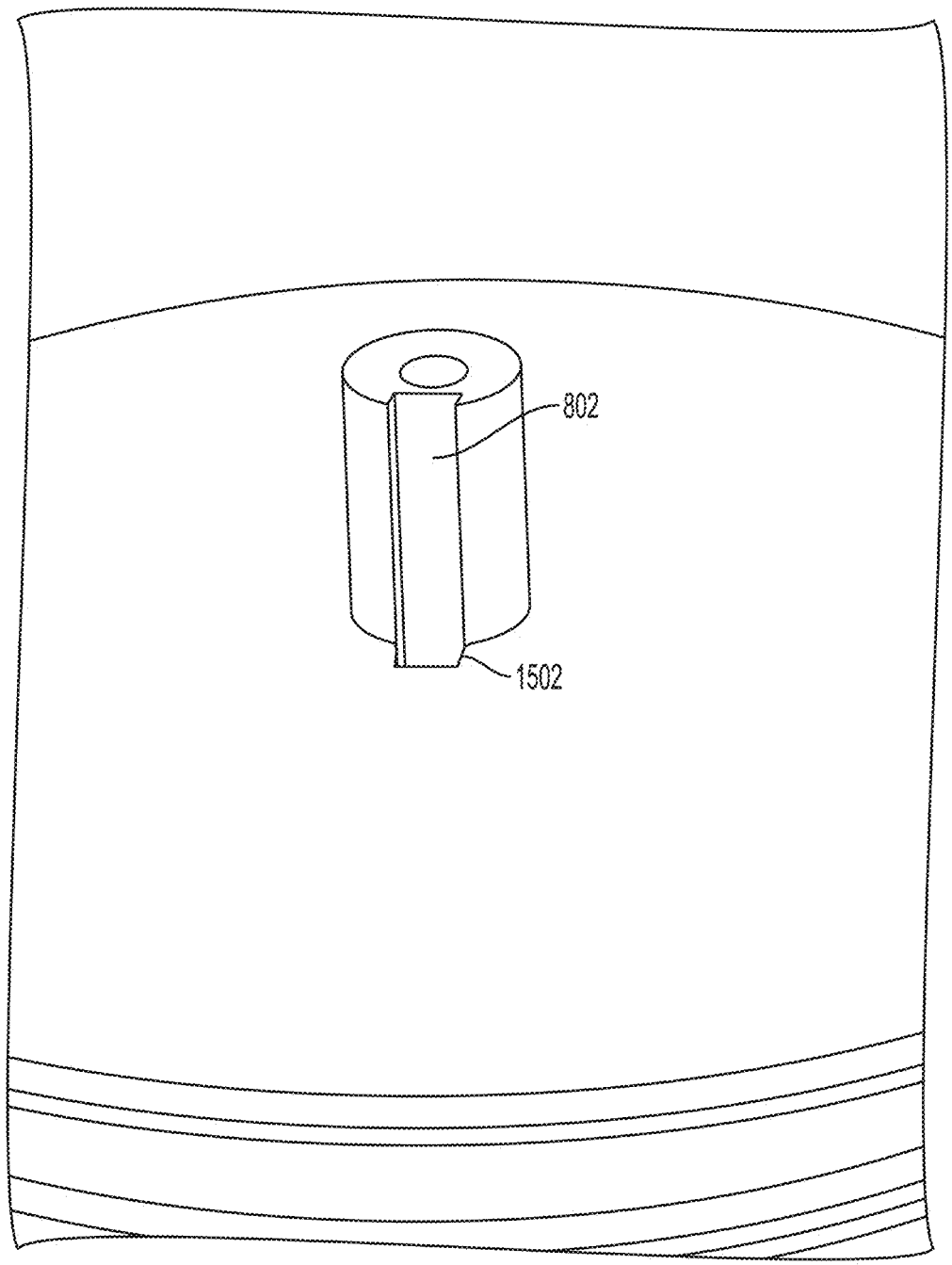
FIG. 15 is a perspective view of a support structure and aligning shaft illustrating how, in some embodiments, keyways of the two components can together for a passage for an alignment key.
Figure 16:
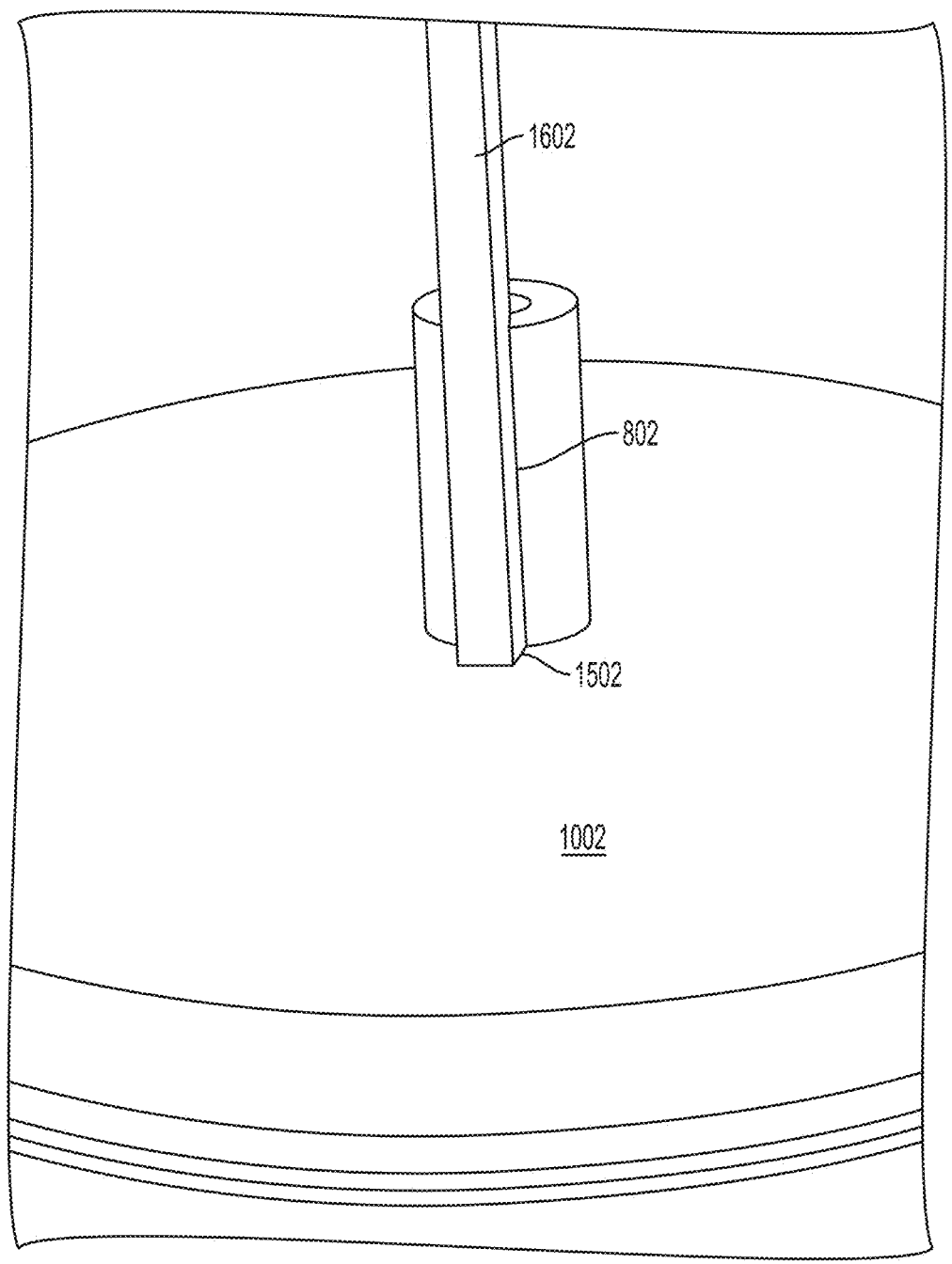
FIG. 16 illustrates how an alignment key may be inserted into the keyway passage shown in FIG. 15.

One example of an angular orientation feature that can be included on the aligning shaft 504 is a slot that can be aligned with a corresponding feature on the support structure. As shown in FIGS. 8, 12, 15, and 16, for example, in some embodiments, the aligning shaft 504 may include a slot 802 along its length. As shown in FIGS. 15 and 16, one way to keep a support structure 1002 aligned with such a slot 802 is to insert an alignment key 1602 into a passage formed by the slot 802 in the aligning shaft 504 and a corresponding slot 1502 in the support structure 1002. In this implementation, the alignment key 1602 may be kept in place until the support structure 1002 has been fully lowered onto the ring magnet 102 on the base 502 and is magnetically adhered thereto.

In another example implementation, as shown in FIG. 14A, the support structure 1002 may itself be formed with a protrusion 1402 that can directly engage the slot 802 in the aligning shaft 504, thus keeping the support structure 1002 in a particular orientation with respect to the poles of the ring magnet 102 as the support structure is lowered onto the ring magnet 102 to form a completed rotor assembly. In this regard, it should be appreciated that any of a number of other "key" or "mating" features may be employed on the aligning shaft 504 and support structure 1002 so as to prevent the support structure 1002 from rotating with respect to the aligning shaft 504 as the support structure 1002 is lowered onto the ring magnet 102, and the invention is not limited to any particular types of features. For example, various shapes can be rotary broached or otherwise formed on the exterior of the alignment shaft 504 and/or the interior of the shaft-engaging hole of the support member 1002 that inhibit rotation between those two components. A few examples of such shapes include a serration, spline, involute rotary spline, double hex, double square, double D, double keyway, triangle, rectangle, square, pentagon, hexagon, etc.

In some implementations, one or more support structures 1002 may be used that have an angular orientation feature as described above, but that also allow both the top and bottom surfaces of the ring magnets 102 to be exposed. Such an implementation allows three or more rotor assemblies to be secured to the same rotor shaft in such a way that they can all transmit torque to the rotor shaft, or vice versa, via their angular orientation features, and also so that adjacent pairs of ring magnets 102 are properly aligned to create high magnet fields in the gaps between them. By properly positioning a respective stator assembly in each such gap, an extremely powerful motor or generator can be created that includes three or more rotor assemblies and two or more stators. The number of rotor assemblies and stators that can be associated with the same rotor shaft in this manner is virtually unlimited.

Again returning to the flow chart of FIG. 18, at the step 1810, the ring magnet 102 and support structure 1002 are removed from the base 502 as a unit. Once again, this step may be achieved in any of a number of ways, and the invention is not limited to any particular technique. As noted above, one way the ejection of a completed rotor assembly 1702 (including both the ring magnet 102 and the support structure 1002) may accomplished is through the use of ejector members 510. As illustrated by the arrows in FIG. 17, the ejector member driver 511 may, for example, drive the ejector members 510 upward with respect to the base 502 so as to engage the lower surface 602 of the ring magnet 102 and lift the ring magnet 102 and support structure 1002 off the base 502 as a unit.

As reflected in step 1812 of the flow chart of FIG. 18, once the ring magnet 102 and support structure 1002 have been separated from the base 502, those components together form a rotor assembly 1702 that can be deployed in an axial flux motor or generator. Because each such rotor assembly 1702 has an angular positioning feature (e.g., a key way or shaft engagement mechanism) that has a particular angular orientation with respect to the poles of the ring magnet 102, the rotor assemblies 1702 can each be attached to a rotor shaft of an axial flux motor or generator to create a magnetic field in a gap between the ring magnets 102 of the two rotor assemblies 1702. The angular positioning features on the rotor assemblies 1702 may be used to lock each of the rotor assemblies 1702 to the rotor shaft (e.g., using a key or other mechanism) so that torque may be transmitted from each of the rotor assemblies 1702 to the rotor shaft, or vice versa. In some implementations, the rotor shaft may have the same angular positioning feature as the aligning shaft 504, and each of the rotor assemblies 1702 may be keyed or otherwise engaged with the rotor shaft in the same way as the aligning shaft 504.

In some motor/generator implementations, a generally planar stator may be positioned within the gap between the ring magnets 102. Examples of such stators, as well as other components of a motor or generator, with which the rotor assemblies 1702 created as described herein may be employed are disclosed in the '625 patent, U.S. Provisional Application Ser. No. 62/236,407, and U.S. Provisional Application Ser. No. 62/236,422, which are incorporated by reference above, as well as in U.S. application Ser. No. 15/199,527, entitled "STRUCTURES AND METHODS FOR THERMAL MANAGEMENT IN PRINTED CIRCUIT BOARD STATORS," filed on Jun. 30, 2016, which is also incorporated herein by reference in its entirety for all purposes.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for forming a magnet assembly, comprising:
    disposing a magnet on a bearing assembly so that the magnet is free to rotate about an axis normal to a surface of a base, the base comprising at least one magnet alignment feature that causes the magnet to rotate about the axis to a preferred angular orientation corresponding to a lower energy configuration as a function of angle about the axis as the magnet is moved closer to the base;
    moving the bearing assembly relative to the base to bring the magnet closer to the base and allow the magnet to achieve the preferred angular orientation;
    further moving the bearing assembly relative the base until a surface of the magnet contacts the surface of the base;
    positioning a support structure on the magnet while keeping an angular positioning feature of the support structure aligned with a particular angular position of the base; and
    separating the magnet and support structure from the base as a unit,
    wherein the magnet comprises a ring magnet having an alternating sequence of north and south poles and the support structure is configured to be attached to a rotor shaft of an axial flux motor or generator so that the angular position of the unit is fixed with respect to the rotor shaft.

2. The method of claim 1, wherein the at least one magnet alignment feature comprises at least one magnetic field generating component that creates a variable magnetic field that varies as a function of angle about the axis.

3. The method of claim 2, wherein the at least one magnetic field generating component comprises a coil through which a current can flow to generate the magnetic field.

4. The method of claim 1, wherein the support structure comprises a back iron.

5. A method for forming a magnet assembly, comprising:
    disposing a magnet on a bearing assembly so that the magnet is free to rotate about an axis normal to a surface of a base, the base comprising at least one magnet alignment feature that causes the magnet to rotate about the axis to a preferred angular orientation corresponding to a lower energy configuration as a function of angle about the axis as the magnet is moved closer to the base;
    moving the bearing assembly relative to the base to bring the magnet closer to the base and allow the magnet to achieve the preferred angular orientation;
    further moving the bearing assembly relative the base until a surface of the magnet contacts the surface of the base;
    positioning a support structure on the magnet while keeping an angular positioning feature of the support structure aligned with a particular angular position of the base; and
    separating the magnet and support structure from the base as a unit, wherein:
    one or more ejector members are movably attached to the base; and
    the act of separating the magnet and support structure from the base comprises moving the ejector members relative to the base so that the one or more ejector members contact the surface of the magnet and cause the magnet to separate from the base.

6. A method for forming a magnet assembly, comprising:
    disposing a magnet on a bearing assembly so that the magnet is free to rotate about an axis normal to a surface of a base, the base comprising at least one magnet alignment feature that causes the magnet to rotate about the axis to a preferred angular orientation corresponding to a lower energy configuration as a function of angle about the axis as the magnet is moved closer to the base;

moving the bearing assembly relative to the base to bring the magnet closer to the base and allow the magnet to achieve the preferred angular orientation;

further moving the bearing assembly relative the base until a surface of the magnet contacts the surface of the base; and positioning a support structure on the magnet while keeping an angular positioning feature of the support structure aligned with a particular angular position of the base;

wherein the at least one magnet alignment feature comprises a characteristic of the base that creates a variable reluctance profile that varies as a function of angle about the axis.

7. The method of claim 6, further comprising:

separating the magnet and support structure from the base as a unit.

8. The method of claim 6, wherein the characteristic comprises at least one discontinuity in the surface of the base.

9. A method for forming a magnet assembly, comprising:

disposing a magnet on a bearing assembly so that the magnet is free to rotate about an axis normal to a surface of a base, the base comprising at least one magnet alignment feature that causes the magnet to rotate about the axis to a preferred angular orientation corresponding to a lower energy configuration as a function of angle about the axis as the magnet is moved closer to the base;

moving the bearing assembly relative to the base to bring the magnet closer to the base and allow the magnet to achieve the preferred angular orientation;

further moving the bearing assembly relative the base until a surface of the magnet contacts the surface of the base; and positioning a support structure on the magnet while keeping an angular positioning feature of the support structure aligned with a particular angular position of the base;

wherein:

an aligning shaft is attached to the base and comprises an angular positioning feature that corresponds to the angular positioning feature of the support structure;

the act of disposing the magnet on the bearing assembly comprises disposing the aligning shaft through a hole in the magnet; and the act of positioning the support structure on the magnet comprises positioning the support structure on the magnet while keeping the angular positioning feature of the support structure aligned with the angular positioning feature of the aligning shaft.

10. The method of claim 9, wherein the act of positioning the support structure on the magnet comprises engaging the angular positioning feature of the support structure with the angular positioning feature of the aligning shaft so as to prevent the support structure from rotating relative to the aligning shaft about the axis.

11. The method of claim 10, further comprising:

separating the magnet and support structure from the base as a unit; and attaching the unit to a rotor shaft of an axial flux motor or generator so that the angular positioning feature of the support structure engages an angular positioning feature of the rotor shaft so as to prevent the unit from rotating relative to the rotor shaft.

12. The method of claim 9, wherein:

the angular positioning features of the support structure and the aligning shaft comprise shapes that can be aligned to form a first passage for an aligning key that prevents the support structure from rotating relative to the aligning shaft about the axis; and the method further comprises inserting an aligning key into the first passage prior to positioning the support structure on the magnet.

13. The method of claim 12, further comprising:

separating the magnet and support structure from the base as a unit;

attaching the unit to a rotor shaft of an axial flux motor, the rotor shaft comprising a shape that can be aligned with the shape of the support structure to form a second passage for an aligning key that prevents the unit from rotating with respect to the rotor shaft; and inserting an aligning key into the second passage so as to prevent the support structure from rotating relative to the rotor shaft.

14. A method for forming a magnet assembly, comprising:

disposing a magnet on a bearing assembly so that the magnet is free to rotate about an axis normal to a surface of a base, the base comprising at least one magnet alignment feature that causes the magnet to rotate about the axis to a preferred angular orientation corresponding to a lower energy configuration as a function of angle about the axis as the magnet is moved closer to the base;

moving the bearing assembly relative to the base to bring the magnet closer to the base and allow the magnet to achieve the preferred angular orientation;

further moving the bearing assembly relative the base until a surface of the magnet contacts the surface of the base; and positioning a support structure on the magnet while keeping an angular positioning feature of the support structure aligned with a particular angular position of the base;

wherein:

the bearing assembly is supported by one or more alignment members movably connected to the base; and the acts of moving and further moving the bearing assembly relative to the base comprise moving the one or more alignment members relative to the base so as to cause the bearing assembly to move relative to the base.

15. An apparatus for forming a magnet assembly, comprising:

a base:

a bearing assembly configured to support a magnet and to allow the magnet to rotate about an axis normal to a surface of the base;

a support structure positioning mechanism configured to position a support structure on the magnet when the magnet is on the base; and one or more ejector members movably attached to the base and configured to contact a surface of the magnet and cause the magnet and support structure to separate from the base as a unit, wherein the base comprises at least one magnet alignment feature that causes the magnet to rotate about the axis to a preferred angular orientation corresponding to a lower energy configuration as a function of angle about the axis as the magnet moves closer to the base, wherein the bearing assembly is movable along the axis to allow the magnet to be moved closer to the base and cause the magnet to achieve the preferred angular orientation, and to be further moved until the surface of the magnet contacts the surface of the base, and wherein the support structure positioning mechanism is configured to position the support structure on the magnet while keeping an angular positioning feature of the support structure aligned with a particular angular position of the base.

16. The apparatus of claim 15, wherein the magnet comprises a ring magnet having an alternating sequence of north and south poles and the support structure is configured to be attached to a rotor shaft of an axial flux motor or generator so that the angular position of the unit is fixed with respect to the rotor shaft.

17. The apparatus of claim 15, wherein the at least one magnet alignment feature comprises at least one magnetic field generating component configured to create a variable magnetic field that varies as a function of angle about the axis.

18. The apparatus of claim 17, wherein the at least one magnetic field generating component comprises a coil through which a current can flow to generate the magnetic field.

19. The apparatus of claim 15, wherein the support structure comprises a back iron.

20. An apparatus for forming a magnet assembly, comprising:
a base;
a bearing assembly configured to support a magnet and to allow the magnet to rotate about an axis normal to a surface of the base; and
a support structure positioning mechanism configured to position a support structure on the magnet when the magnet is on the base,
wherein the base comprises at least one magnet alignment feature that causes the magnet to rotate about the axis to a preferred angular orientation corresponding to a lower energy configuration as a function of angle about the axis as the magnet moves closer to the base,
wherein the bearing assembly is movable along the axis to allow the magnet to be moved closer to the base and cause the magnet to achieve the preferred angular orientation, and to be further moved until a surface of the magnet contacts the surface of the base,
wherein the support structure positioning mechanism is configured to position the support structure on the magnet while keeping an angular positioning feature of the support structure aligned with a particular angular position of the base, and
wherein the at least one magnet alignment feature comprises a characteristic of the base that creates a variable reluctance profile that varies as a function of angle about the axis.

21. The apparatus of claim 20, wherein the characteristic comprises at least one discontinuity in the surface of the base.

22. An apparatus for forming a magnet assembly, comprising:
a base;
a bearing assembly configured to support a magnet and to allow the magnet to rotate about an axis normal to a surface of the base;
a support structure positioning mechanism configured to position a support structure on the magnet when the magnet is on the base; and an aligning shaft attached to the base, the aligning shaft comprising an angular positioning feature that corresponds to an angular positioning feature of the support structure,
wherein the base comprises at least one magnet alignment feature that causes the magnet to rotate about the axis to a preferred angular orientation corresponding to a lower energy configuration as a function of angle about the axis as the magnet moves closer to the base,
wherein the bearing assembly is movable along the axis to allow the magnet to be moved closer to the base and cause the magnet to achieve the preferred angular orientation, and to be further moved until the surface of the magnet contacts the surface of the base, and
wherein the support structure positioning mechanism is configured to position the support structure on the magnet while keeping the angular positioning feature of the support structure aligned with a particular angular position of the base and the angular positioning feature of the aligning shaft.

23. The apparatus of claim 22, wherein the angular positioning feature of the support structure is configured and arranged to engage the angular positioning feature of the aligning shaft so as to prevent the support structure from rotating relative to the aligning shaft about the axis.

24. The apparatus of claim 22, wherein:
the angular positioning features of the support structure and the magnet comprise shapes that can be aligned to form a passage for an aligning key that prevents the support structure from rotating relative to the aligning shaft about the axis.

25. The apparatus of claim 24, further comprising the aligning key.

26. An apparatus for forming a magnet assembly, comprising:
a base;
a bearing assembly configured to support a magnet and to allow the magnet to rotate about an axis normal to a surface of the base;
a support structure positioning mechanism configured to position a support structure on the magnet when the magnet is on the base; and
one or more alignment members movably connected to the base and configured to support the bearing assembly and cause the bearing assembly to move relative to the base,
wherein the base comprises at least one magnet alignment feature that causes the magnet to rotate about the axis to a preferred angular orientation corresponding to a lower energy configuration as a function of angle about the axis as the magnet moves closer to the base,
wherein the bearing assembly is movable along the axis to allow the magnet to be moved closer to the base and cause the magnet to achieve the preferred angular orientation, and to be further moved until the surface of the magnet contacts the surface of the base, and
wherein the support structure positioning mechanism is configured to position the support structure on the magnet while keeping the angular positioning feature of the support structure aligned with a particular angular position of the base.

27. The apparatus of claim 26, wherein the bearing assembly comprises a thrust bearing.

* * * * *